(12) United States Patent
Gao

(10) Patent No.: US 8,528,502 B1
(45) Date of Patent: Sep. 10, 2013

(54) COMBINATION THROW TOY AND HANDLE

(75) Inventor: Terry Gao, Baltimore, MD (US)

(73) Assignee: Innovative Design & Sourcing, LLC

( * ) Notice: Subject to any disclaimer, the term of this patent is extended or adjusted under 35 U.S.C. 154(b) by 0 days.

(21) Appl. No.: 13/564,145

(22) Filed: Aug. 1, 2012
(Under 37 CFR 1.47)

(51) Int. Cl.
*A01K 29/00* (2006.01)

(52) U.S. Cl.
USPC .......................................... 119/708; 119/707

(58) Field of Classification Search
USPC ................. 119/702, 707, 708, 709, 710, 711; 124/4, 5, 42, 44, 41.1; 446/36, 45; 473/588, 473/614, 138, 590, 613; 273/317
See application file for complete search history.

(56) References Cited

U.S. PATENT DOCUMENTS

| | | | | |
|---|---|---|---|---|
| 1,168,808 A * | 1/1916 | Hoffmann | | 124/5 |
| 1,877,100 A * | 9/1932 | Wayte | | 473/586 |
| 1,978,137 A * | 10/1934 | Kohn | | 473/614 |
| 2,388,463 A * | 11/1945 | Benecke | | 473/234 |
| 2,705,148 A * | 3/1955 | Waller | | 273/317 |
| 2,902,023 A * | 9/1959 | Waller | | 124/5 |
| 3,557,768 A * | 1/1971 | Lake | | 124/5 |
| 3,841,292 A * | 10/1974 | Hoffman | | 124/5 |
| 3,897,068 A * | 7/1975 | Staples | | 473/233 |
| 4,076,004 A * | 2/1978 | Huelskamp | | 124/5 |
| 4,364,371 A * | 12/1982 | Woolard | | 124/5 |
| 4,794,905 A * | 1/1989 | Woolard | | 124/5 |
| 5,129,650 A * | 7/1992 | Hayman | | 473/289 |
| 6,918,202 B2 * | 7/2005 | Merritt | | 43/4.5 |
| 7,208,184 B2 * | 4/2007 | Chen | | 426/1 |
| 7,895,995 B2 * | 3/2011 | Simon | | 124/5 |

* cited by examiner

*Primary Examiner* — T. Nguyen
(74) *Attorney, Agent, or Firm* — Baker & Hostetler LLP

(57) ABSTRACT

A combination throw toy and handle wherein the handle comprises an elongated shaft having a distal end upon which the toy is mounted and a proximal end for gripping the handle and with the toy comprising a hollow body adapted to slidably mount over the distal end of the handle to permit the toy to be readily released from the shaft of the handle and a plurality of projections extending outwardly from the body of the toy for simulating wings and with the toy body composed of a material including polypropylene, paraffin oil, and an elastomer combination consisting of styrene-ethylene-butylene-stryrene and styrene-butylene-stryrene in a proportion to one another such that the toy will remain afloat when thrown into water.

6 Claims, 1 Drawing Sheet

COMBINATION THROW TOY AND HANDLE

FIELD OF THE INVENTION

This invention relates to a combination throw toy and handle, primarily for a dog, with the handle adapted to permit the toy be manually propelled a long distance from the handle and with the toy capable of staying afloat when propelled into a body of water.

BACKGROUND ART

It is well known to exercise animals, particularly dogs, by playing the game of fetch, which provides healthy exercise for a dog. There are many commercially available toys adapted to be propelled from a handle substantial distances. However, despite the fact that dogs are natural retrievers, if the toy lands in a body of water or a puddle deep enough to submerge the toy, it will not be retrieved unless the toy is able to stay afloat. Conventional throw toys are not designed to stay afloat once thrown into water.

SUMMARY OF THE INVENTION

The combination throw toy and handle of the present invention has been designed to exert minimal strain on the arm of the person launching the toy, even after repeated use, and to enable the toy to stay afloat when propelled into a body of water.

The combination throw toy and handle of the present invention comprises a handle having an elongated shaft with a distal end upon which the toy is mounted and a proximal end for gripping the handle, with the toy having a hollow body which slidably engages the distal end of the handle and a plurality of projections extending outwardly from the body simulating wings and with the body of the toy and projections consisting of a material composition including polypropylene, paraffin oil, and an elastomer combination composed of styrene-ethylene-butylene-stryrene and styrene-butylene-stryrene such that the toy will remain afloat when thrown into water. In the preferred embodiment, the elastomer combination consists of 15%±2% by volume of styrene-ethylene-butylene-stryrene and 30%±2% by volume of styrene-butylene-stryrene.

In the preferred embodiment of the invention, the body of the toy is preferably of cylindrical geometry and hollow, with the distal end of the handle comprising a stem preferably of cylindrical geometry to accommodate the body of the toy, and with the stem of the handle having a diameter slightly smaller than the diameter of the hollow body of the toy and having at least one longitudinal channel defining a groove extending lengthwise of the stem for facilitating the release of the toy body from the distal end of the handle when manually propelled from the proximal end thereof.

BRIEF DESCRIPTION OF DRAWINGS

Additional advantages of the combination toy and handle will become apparent from the following detailed description of a preferred embodiment when read in conjunction with the following drawings of which.

DETAILED DESCRIPTION OF THE INVENTION

Figures 1, 2:
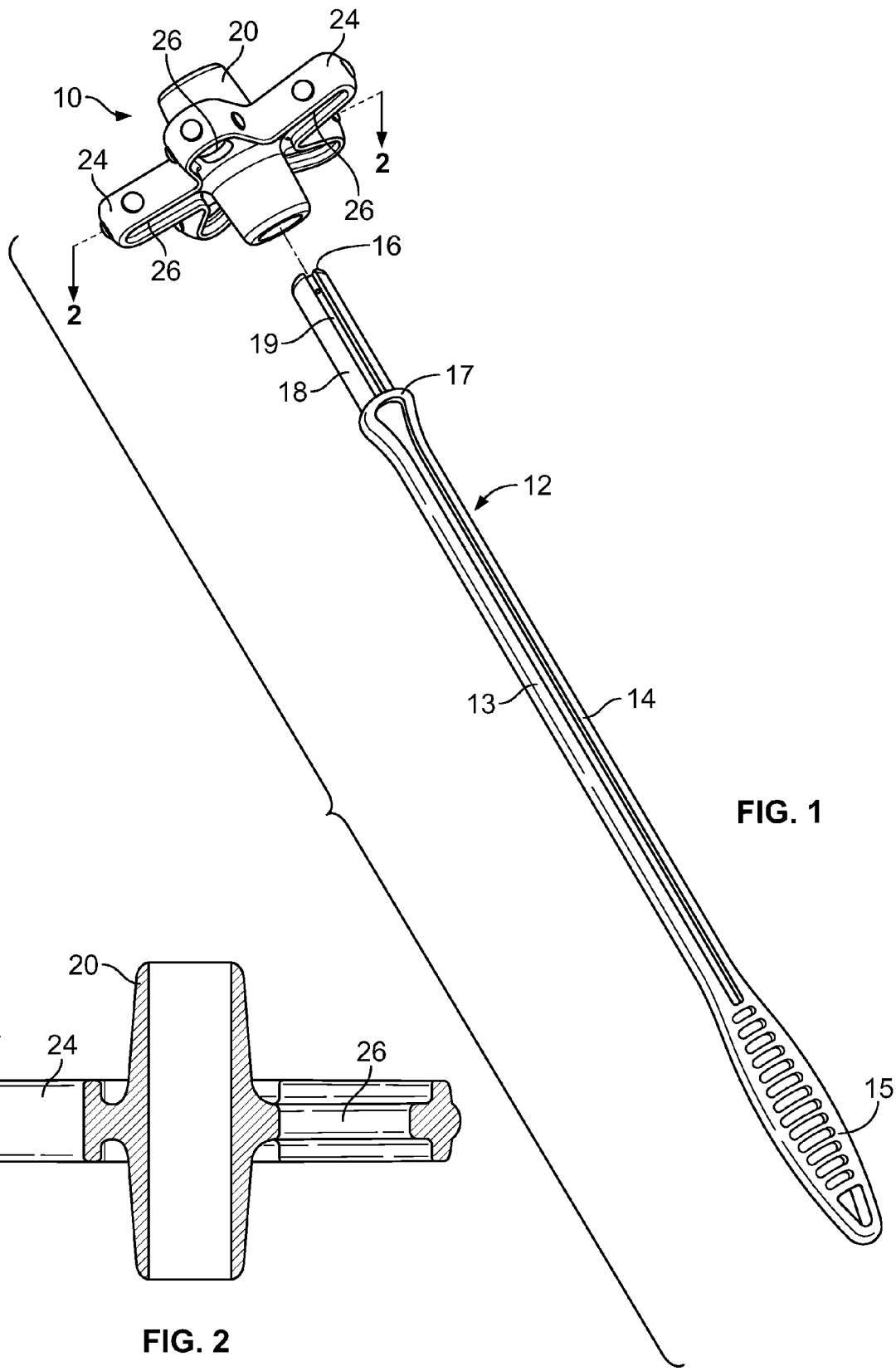
FIG. 1 is an exploded view in perspective of the combination toy and handle of the present invention.
FIG. 2 is a cross sectional view of the toy taken along the lines 2-2 in FIG. 1.

The combination toy and handle of the present invention is shown in FIG. 1 with the toy represented by reference numeral 10 and the handle represented by reference numeral 12. The handle 12 has an elongated shaft 14 having a proximal end 15 for manually gripping the handle 12, a central section 13 and a distal end 16 upon which the toy 10 is slidably mounted.

The shaft 14 of the handle 12 includes a stem 18 which extends from a shoulder 17 at an end of the central section of the shaft 14 to the distal end 16 of the handle 12. The toy 10 has a hollow cylindrical body 20 with a diameter slightly larger than the diameter of the stem 18 which, preferably, is of cylindrical geometry. The shoulder 17 acts as a rest stop for the stem 18 limiting the distance the toy 10 may slide over the distal end 16 of the handle 12. The stem 18 includes a plurality of grooves 19 extending lengthwise from the distal end 16 of the handle 14 to the shoulder 17 to facilitate the manual release of the toy 10 from the handle 12 when the proximal end 15 of the handle 12 is gripped in one hand and the handle 12 manually snapped preferably from an overhead position. This enables the toy 10 to be propelled a substantial distance.

The toy 10 includes a plurality of projections 24 extending radially outwardly from the body 20 of the toy 10. The projections 24 simulate wings and function to stabilize the flight of the toy 10 in motion. Each projection 24 has a configuration in the shape of an arch or inverted letter U with an open space 26 between the outer end of the projection 24 and the cylindrical body 20. The open space 26 may have any desired geometry preferably elliptical.

The body 20 of the toy 10 inclusive of the projections 24 is composed of a material composition including polypropylene, paraffin oil, and an elastomer combination of styrene-ethylene-butylene-stryrene and a styrene-butylene-stryrene such that the toy will remain afloat when thrown into water. A filler preferably in the form of a powder of, for example, $CaCO_3$ may be added in addition to a conventional anti-aging agent as is well known to those skilled in the art. In the preferred embodiment, the concentration of the elastomer combination should consist of 15%±2% by volume of an elastomer of styrene-ethylene-butylene-stryrene ("SEBS") and 30%±2% by volume of a thermoplastic elastomer of styrene-butylene-stryrene ("SBS") with the remainder by volume selected from polypropylene, paraffin oil, filler and an anti-aging component with preferably about 35%±2% paraffin oil, about 10%±2% by volume of polypropylene remainder filler and anti-aging component with optimally about 5%±2% filler and anti-aging component.

The elastomer combination employs polyolefin plastics preferably polyethylene and polypropylene for forming the elastomer styrene-ethylene-butylene-stryrene ("SEBS") and uses polybutadiene and styrene to form a synthetic rubber elastomer of styrene-butylene-stryrene ("SBS"). The proportion of the elastomer styrene-ethylene-butylene-stryrene ("SEBS") to the themoplasic elastomer of styrene-butylene-stryrene ("SBS") is critical to the subject invention to insure that the toy will remain afloat when thrown into water and should be in a ratio of SEBS to SBS of between about 0.45 to 0.55 for the toy composition to remain afloat when thrown into water.

What is claimed is:

1. A combination retrievable dog toy and handle wherein the handle comprises an elongated shaft having a distal end upon which the retrievable dog toy is mounted and a proximal end for gripping the handle, with the retrievable dog toy comprising a hollow body composed of a soft elastomeric material sized to enable a dog to grip the hollow toy body in the mouth of the dog during retrieval of the dog toy and with the retrievable dog toy adapted to be slidably mounted over the distal end of the handle to enable the dog toy to be readily released from the shaft of the handle and a plurality of projections extending outwardly from the body of the retrievable dog toy for simulating wings wherein the body of the retrievable dog toy and its projections is of a material composition consisting of: polypropylene, paraffin oil, an elastomer combination consisting of styrene-ethylene-butylene-stryrene ("SEBS") and styrene-butylene-stryrene ("SBS") in a fixed ratio to one another of between about 0.45 to 0.55, with the remainder composed of a filler and an anti-aging component such that the dog toy will remain afloat for retrieval by a dog when thrown or propelled into water.

2. A combination retrievable dog toy and handle as defined in claim 1 wherein the elastomer styrene-ethylene butylene-styrene ("SEBS") is present in a concentration of 15%±2% by volume and the elastomer styrene-butylene-stryrene ("SBS") is present in a concentration of 30%±2% by volume with the remainder of said toy body composed by volume of 35%±2% paraffin oil, 10%±2% by volume of polypropylene and about 5%±2% filler and anti-aging component.

3. A combination retrievable dog toy and handle as defined in claim 1 wherein the stem of the handle is of cylindrical geometry and of a diameter to accommodate the hollow body of the toy and includes at least one longitudinal channel defining a groove extending lengthwise of the stem for facilitating the manual release of the toy body from the distal end of the handle by a human when the human manually releases the retrievable dog toy from the proximal end of the handle.

4. A combination retrievable dog toy and handle as defined in claim 3 wherein the body of the toy includes a plurality of radial projections which simulate wings having an open space in each projection.

5. A combination retrievable dog toy and handle as defined in claim 4 wherein each projection has a configuration in the shape of an arch or inverted letter U.

6. A combination retrievable dog toy and handle as defined in claim 5 wherein each open space is of an elliptical geometry.

* * * * *